Figure 1:
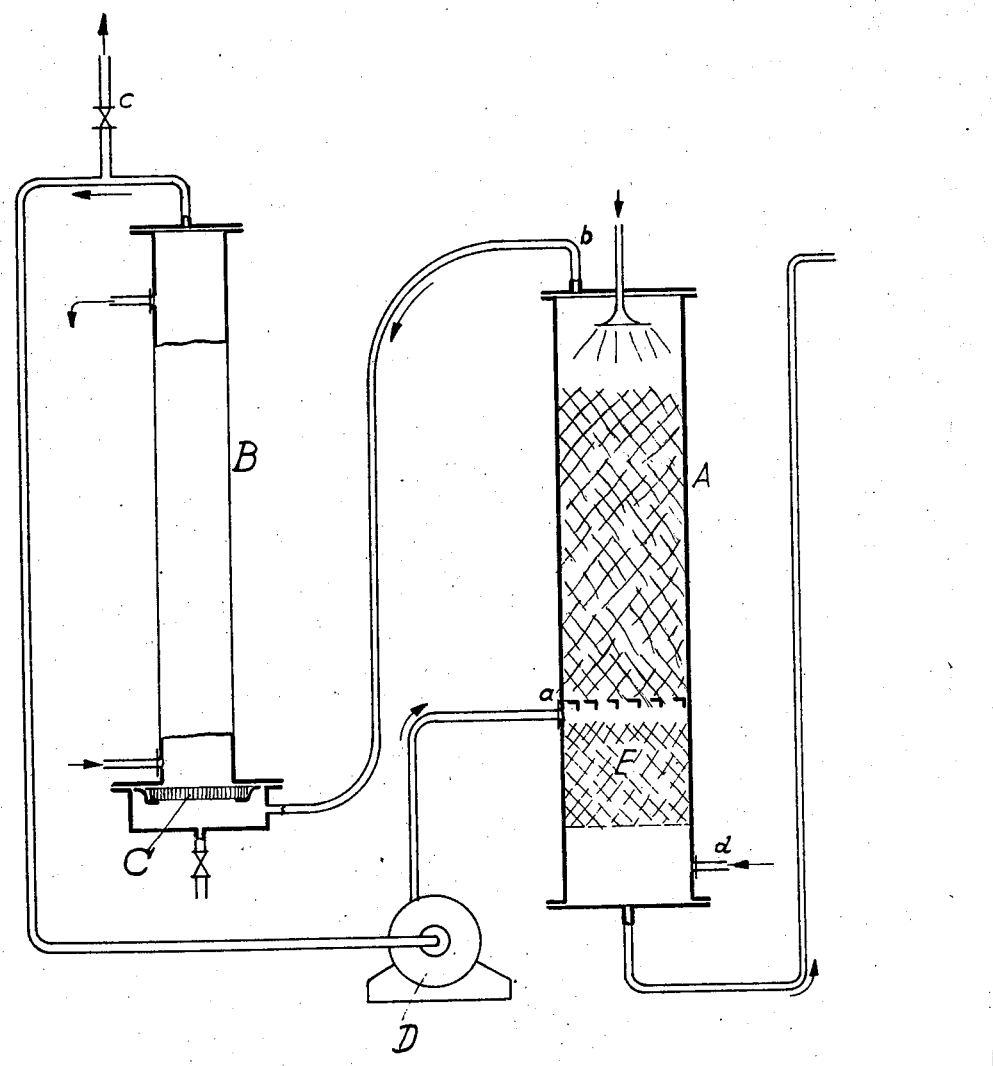

Feb. 20, 1945. G. PFLEIDERER ET AL 2,369,912
PROCESS FOR PREPARING HYDROGEN PEROXIDE
Filed Nov. 4, 1938 2 Sheets-Sheet 1

Georg Pfleiderer
Hans-Joachim Riedl
INVENTORS

BY

THEIR ATTORNEYS

Patented Feb. 20, 1945

2,369,912

UNITED STATES PATENT OFFICE 2,369,912

PROCESS FOR PREPARING HYDROGEN PEROXIDE

Georg Pfleiderer and Hans-Joachim Riedl, Ludwigshafen-on-the-Rhine, Germany; vested in the Alien Property Custodian Application November 4, 1938, Serial No. 238,796
In Germany November 10, 1937

4 Claims. (Cl. 23—207)

The present invention relates to the production of peroxides.

It has already been proposed to prepare peroxides, as for example hydrogen peroxide or also alkali metal peroxides, by subjecting autoxidisable organic compounds, as for example hydrazobenzene or anthrahydroquinone derivatives, in a cycle to alternate oxidation with oxygen and reduction to the initial material again after the peroxides formed by the oxidation have been removed. It has also been proposed to carry out the said reduction with hydrogen in the presence of a catalyst. In carrying out the said process, however, there is the difficulty that the activity of the catalyst subsides relatively rapidly.

We have now found that the said drawback can be obviated by removing to a great extent the remainders of peroxide in the reaction liquid and the oxygen dissolved during the oxidation, after the separation of the peroxide formed and before the reduction. This may be effected by treating the reaction liquid prior to the reduction with readily oxidisable substances which react with the active oxygen chemically combined in the peroxide and if they are able to do so, also with the dissolved molecular oxygen, but which must naturally not change the reaction liquid unfavourably. For this purpose, manganous and ferrous compounds, such as ferrous sulphate solutions or alkaline solutions or suspensions containing ferrous hydroxide, are suitable.

The remainders of peroxide may in some cases also be removed by treating the reaction liquid with substances which bind peroxides, such as caustic soda, sodium metaborate or sodium carbonate. These substances are used in aqueous solution or in solid form.

Another means of removing the residual peroxide which has the advantage of not requiring any continuous consumption of chemicals, consists in treating the reaction liquid before the reduction with a catalyst which effects the decomposition of the peroxides. As is known, many heavy metals, such as iron, nickel, copper, silver and other noble metals, such as platinum and palladium, act in this way. Metal oxides or hydroxides, in particular lead oxide, are also very suitable. These catalysts may be used in the form of pieces, in a finely divided form or on carriers. The active oxygen of the peroxide is thus converted into molecular oxygen which generally escapes in the gaseous form if the liquid is still saturated with oxygen from the oxidation; otherwise it remains dissolved and must also be removed.

The decomposition of the peroxide may be effected in conjunction with the removal of the dissolved oxygen by carrying out the treatment with the decomposing catalyst in the presence of autoxidisable organic substance. For this purpose a part of the reduced reaction liquid may be branched off from the main cycle and added to the reaction liquid to be treated with the decomposition catalyst; or, the oxidation in a cycle may be carried not quite to its end so that a part of the autoxidisable substance remains. The removal of the dissolved oxygen, when working in this manner, probably takes place in that peroxide is first formed by the autoxidisable substance and the peroxide is again decomposed by the catalyst whereby half of the oxygen is again set free. The oxygen set free again forms peroxide, and so on until all the oxygen and all the peroxide have been used up. The result is that 2 molecular proportions of autoxidisable substance are used for each molecular proportion of oxygen to be removed.

The said method of work may also be modified by first exposing the reaction liquid to the treatment with the decomposition catalyst in the absence of autoxidisable substance but in the presence of hydrogen and a reducing catalyst, as for example active palladium or nickel. Under the action of the same there is then formed during the decomposition treatment fresh autoxidisable substance which further reacts with the oxygen to be removed in the manner described above. Since most reducing catalysts also act at the same time to catalyse the decomposition of peroxides, a special decomposition catalyst in addition to the reduction catalyst is not always necessary when working in this way. As already mentioned, the activity of the reduction catalyst soon subsides, but for the production of the small amounts of autoxidisable substance necessary in the present case they suffice for longer periods.

The dissolved oxygen may also be removed by reducing the oxygen pressure over the reaction liquid, for example by scavenging the liquid with an indifferent gas, preferably with hydrogen which at this point of the process may be regarded as inert. For example the hydrogen may be used which is withdrawn from the hydrogenation apparatus to avoid the collection of foreign gases. Instead of this, the reaction liquid may also be placed under reduced pressure, for example by leading it over a barometric vacuum and pumping away the oxygen set free with a vacuum pump.

In this method there is the drawback that for the thorough expelling of the oxygen a large amount of the inert scavenging gas must be used, especially when in the case of using volatile combustible solvents the partial pressure of the oxygen in the resulting gas mixture should be so small that the latter is not explosive. By the large amount of scavenging gas necessary, a correspondingly large amount of solvent is entrained as vapour. This is either lost or its recovery necessitates considerable expenditure. Similar considerations apply when removing the dissolved molecular oxygen from the solution by evacuation, volatile solvent also being evaporated.

In view of these reasons, it is in many cases recommendable to treat the gas mixture containing the expelled oxygen with an absorption agent for oxygen, preferably with the reduced solution of autoxidisable substance used in the same process. When using a scavenging gas, the gas thus freed to a great extent from oxygen may be used again in circulation for the expelling of oxygen; since it is already saturated with solvent vapour, there is no further evaporation of solvent. When removing the oxygen from the solution by evacuation, there takes place during the treatment of the gas mixture under reduced pressure with the reduced solution simultaneously absorption of the oxygen and, in particular when the absorbing solution is kept at lower temperature than the evacuated, condensation of the solvent vapours. An advantageous modification of the process consists in sucking off the gas mixture containing the expelled oxygen with a jet pump which is operated with the reduced solution of the autoxidisable substance.

A further advantage of this procedure consists in the fact that the expelled oxygen is also used for the production of peroxides.

Two examples of apparatus according to this procedure are shown diagrammatically in the accompanying drawings.

The apparatus shown in Figure 1 is worked with an inert gas. The solution to be freed from oxygen trickles down over filler bodies in a tower A, while the scavenging gas, which enters at $a$ and leaves at $b$, flows in counter-current thereto. In a tower B, the gas mixture containing oxygen flows in a state of fine dispersion, caused by a porous plate C, through a layer of reduced solution, whereby it is freed to a great extent from oxygen. After leaving the tower B, the scavenging gas is moved in a cycle to the tower A by a blower D. If a specially thorough expelling of the oxygen is desired, a second layer E of filler bodies may be arranged in the tower A below the inlet of the circulated scavenging gas, through which a comparatively small amount of fresh scavenging gas free from oxygen, which enters at $d$, is allowed to flow, and this mixes with the circulating scavenging gas. In this case a corresponding amount of scavenging gas, having regard to the amount of scavenging gas which dissolves in the liquid, is removed from the cycle at $c$.

Figure 2:
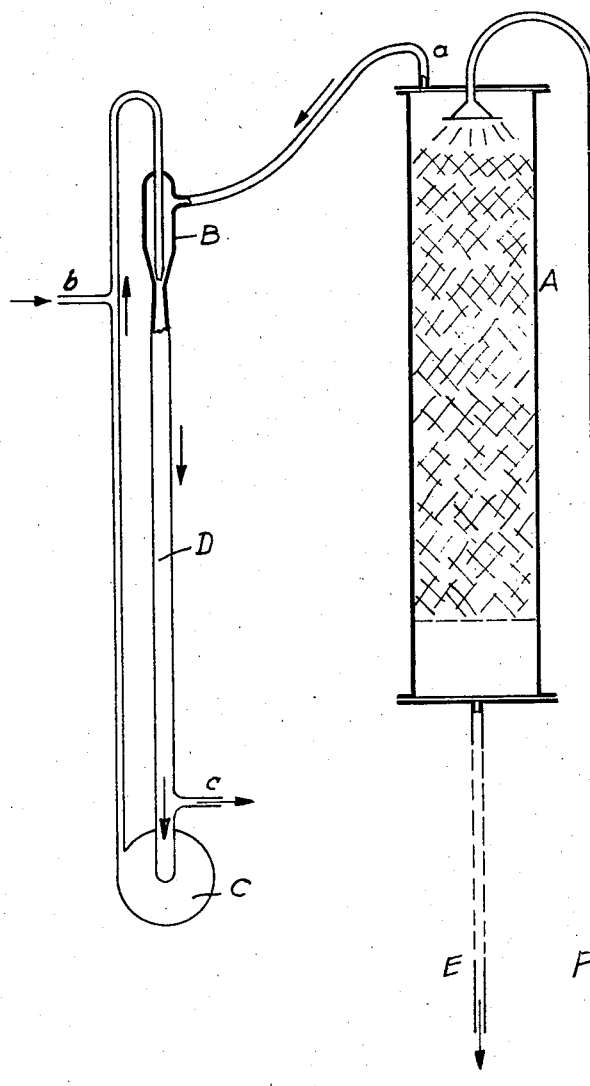

In the apparatus shown in Figure 2, the oxygen is removed from the solution by evacuation. The solution, if desired somewhat preheated, trickles down over filler bodies in a tower A which is arranged at such a height above the other parts of apparatus, that the liquid-column in the connecting tubes E and F compensates the atmospheric pressure. The expelled oxygen and the solvent vapour are sucked off at $a$ by means of a jet pump B operated with reduced solution which enters at $b$ and leaves at $c$. In order to augment the current or reduced solution present in the process, a part of the reduced solution is driven through the jet pump B in a cycle by means of the circulatory pump C. In the comparatively wide tube D, the bubbles of gas mixture sucked in are compressed to normal pressure and practically completely absorbed or condensed. The tube D may be provided with a cooling device.

It is especially advantageous to combine a number of the said methods of working with each other. It is advantageous to proceed as follows:

In the cycle of the reaction liquid it is first treated, before the reduction and after the separation of the peroxide formed, with a decomposition catalyst, the dissolved oxygen is then removed for the greater part by scavenging with gases or by means of reduced pressure, and any remainders of peroxide and oxygen still present are finally removed by treatment with a decomposition catalyst in the presence of autoxidisable organic substances. This combined method of working requires less autoxidisable substance than the use of the last stage alone.

It is preferable to insert in the cycle of the working solution a partial drying, as for example by high percentage aqueous potassium carbonate solution, since the solution becomes saturated with water during the washing and in the decomposition of hydrogen peroxide a further small amount of water is formed, and this water would otherwise separate and may give rise to contamination of the catalyst. The same result is also obtained by carrying out the washing at somewhat lower temperature than the other steps or by cooling the reaction liquid at another point in the cycle and removing the water thus separated. When the removal of water is effected by treatment with a drying agent, it may also be combined with one of the above-mentioned measures, for example a suitable heavy metal oxide or hydroxide may be suspended in the high percentage potassium carbonate solution.

The following example will further illustrate the nature of this invention but the invention is not restricted to this example.

*Example*

A solution of 2-ethylanthraquinone (90 grams per liter) in a mixture of 6 parts by volume of benzene and 4 parts of methylcyclohexanol is treated in the presence of a nickel catalyst with hydrogen so that about half of the quinone is reduced to hydroquinone or quinhydrone. The quinone is then reformed by the action of oxygen. From 98 to 99 per cent of the hydrogen peroxide formed by the oxidation are then washed out with water in counter-current; the working solution is finally reduced again in a cycle and so on. Before the reduction, the working solution which has been washed out with water is first allowed to trickle over small pieces of porous oxidised nickel in a tower, while hydrogen is allowed to flow in counter-current at the same time; in this way a part of the hydrogen peroxide which has not been washed out is decomposed and the dissolved oxygen is expelled for the most part. The solution is then treated in a stirring container with hydrogen and a nickel catalyst (preliminary catalyst) serving simultaneously as a reducing and decomposing catalyst, whereby the last traces of peroxide and oxygen are removed from the solution and at the same time a little 2- ethylanthrahydroquinone is reformed. Then follows the reduction proper with hydrogen and a nickel catalyst of good activity (main catalyst). When the preliminary catalyst has become exhausted to such an extent that it is incapable of producing the small amount of hydroquinone necessary for the preliminary purification, a part of the reduced solution (about one tenth) is branched off from the main cycle before the oxidation and added to the solution before the preliminary catalyst (without any need for renewing the preliminary catalyst). In this way, with a given amount of main catalyst, about 220 times its weight of hydrogen peroxide may be obtained at a technically-useful speed, while without the said treatment between the washing and the reduction, not a fifth of this amount can be obtained under otherwise identical conditions.

What we claim is:

1. In a cyclic process of preparing hydrogen peroxide by subjecting an autoxidizable organic compound in a liquid to alternate oxidation with oxygen and at least partial catalytic reduction with hydrogen in the presence of a catalyst to the initial autoxidizable organic compound and intermediately removing from the reaction liquid the hydrogen peroxide formed by the oxidation, the step which comprises treating the reaction liquid prior to said catalytic reduction with a different catalyst of such nature and under such conditions that the catalyst per se decomposes the hydrogen peroxide remaining in the reaction liquid but will not effect substantially the decomposition of the oxidized form of said autoxidizable liquid and removing oxygen from said liquids to effect the removal to a great extent of the hydrogen peroxide not removed in said intermediary step and of oxygen dissolved in said liquid.

2. The process as set forth in claim 1, wherein the autoxidizable organic compound is selected from a group consisting of hydrazobenzene and its derivatives.

3. The process as set forth in claim 1, wherein the autoxidizable organic compound is selected from a group consisting of anthrahydroquinone and its derivatives.

4. The process as set forth in claim 1, wherein the catalysts are metallic selected from a group consisting of iron, copper, nickel, silver, platinum, and palladium.

GEORG PFLEIDERER.
HANS-JOACHIM RIEDL.